Oct. 4, 1955         M. W. BOWERSOX         2,719,393
             COMBINATION FLOAT AND HARROW
Filed July 28, 1950                    2 Sheets-Sheet 1
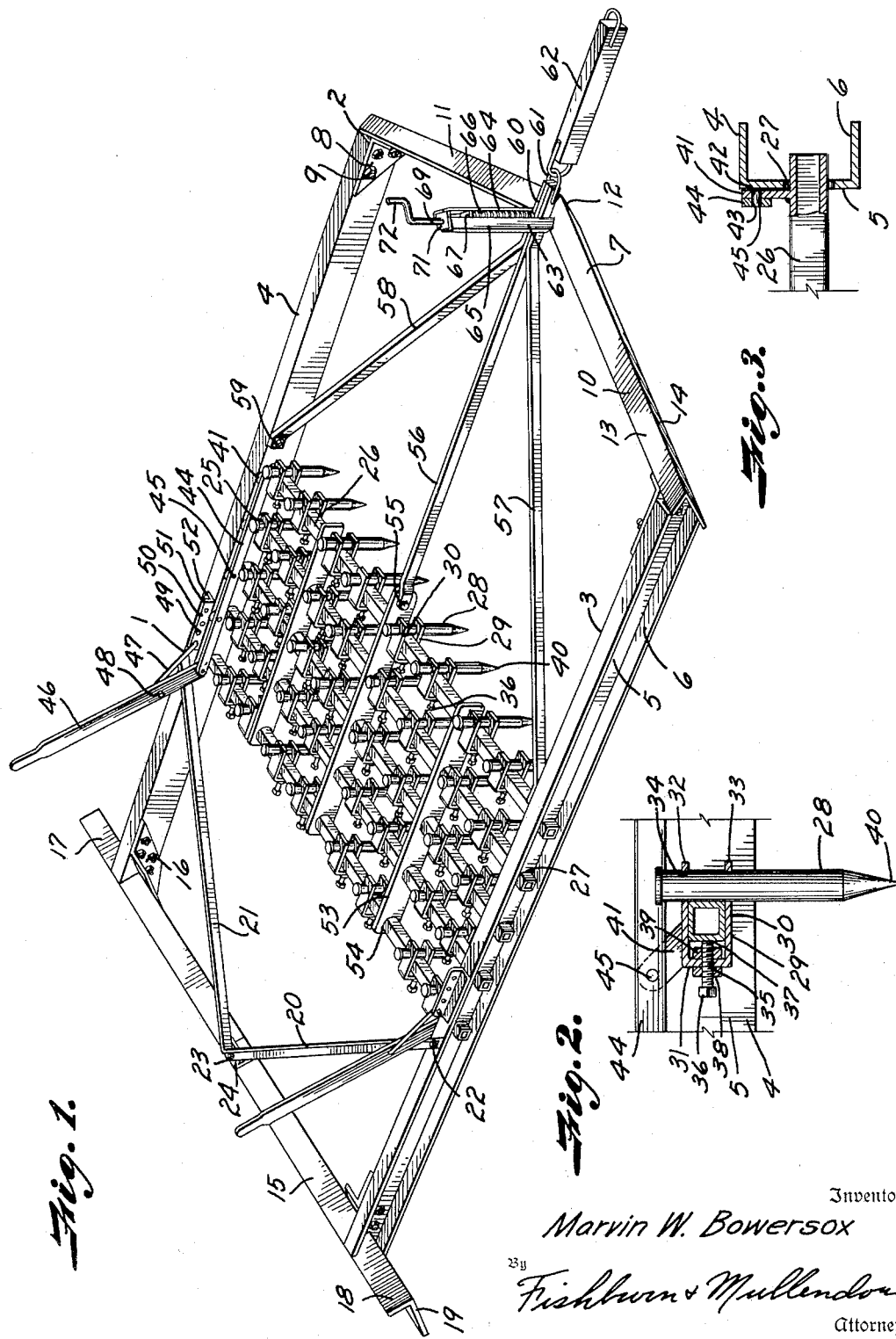
Inventor
Marvin W. Bowersox
By Fishburn & Mullendore
Attorneys Oct. 4, 1955 — M. W. BOWERSOX — 2,719,393
COMBINATION FLOAT AND HARROW
Filed July 28, 1950 — 2 Sheets-Sheet 2
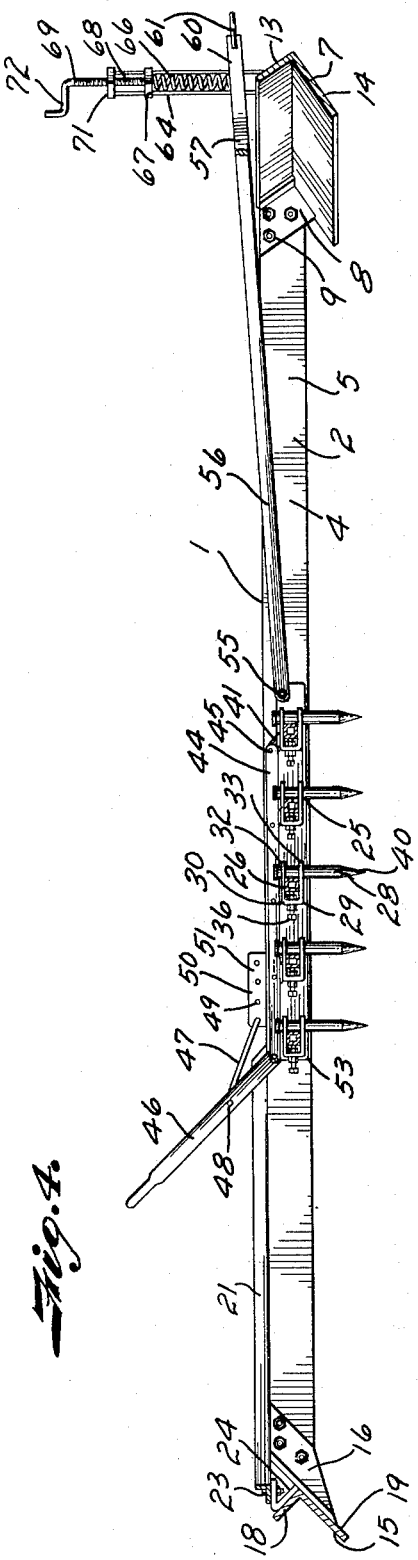
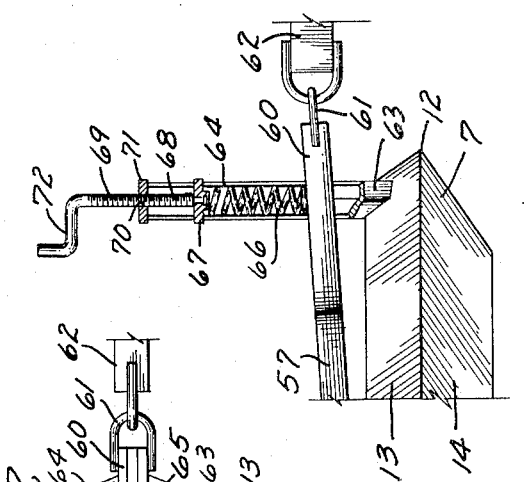
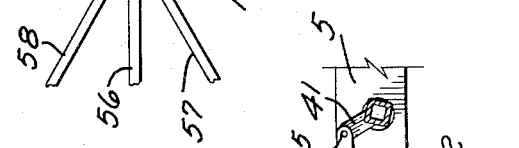
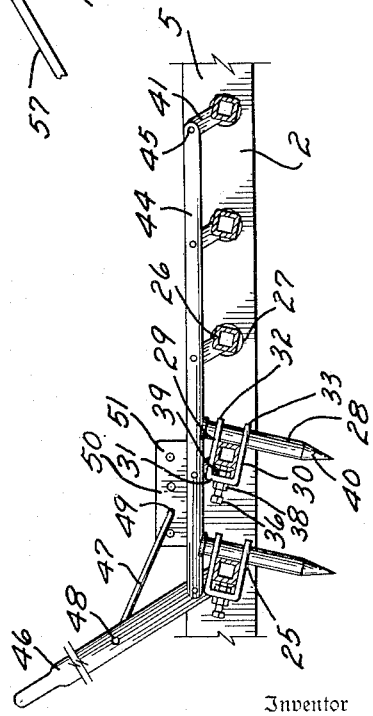
Inventor
Marvin W. Bowersox
By Fishburn & Mullendore
Attorneys

United States Patent Office 2,719,393
Patented Oct. 4, 1955

2,719,393

COMBINATION FLOAT AND HARROW

Marvin W. Bowersox, Elk City, Kans.

Application July 28, 1950, Serial No. 176,451

1 Claim. (Cl. 55—103)

This invention relates to agricultural implements and more particularly to a combination float and harrow for soil working such as leveling ridges, breaking clods or lumps and smoothing the worked soil as in preparing seed beds and the like.

The objects of the present invention are to provide a combination float and harrow having the float frame adjustably and tiltably mounted relative to the hitch for adjusting the pressure or proportion of the weight and forces acting on the soil being worked; to provide a float and harrow with a pivoted tongue for connecting same to a tractor or the like with a spring stabilizer between the tongue and float frame for facilitating movement of the float over irregular surfaces; to provide such an implement with a harrow section having a plurality of angularly adjustable depending teeth which work the soil and create a retarding force on the frame cooperating with the hitch mounting to adjust the force of contact between the float and soil being worked; to provide a combination float and harrow in which the operating portions are adjustable to meet different operating conditions; to provide an adjustable tooth mounting whereby the teeth may be moved as desired and easily repaired or replaced; and to provide a strong, durable, braced structure which is capable of economic manufacture and efficient operation in soil working prior to planting and the like.

In accomplishing these and other objects of the present invention, I have provided improved details of structure, the preferred forms of which are illustrated in the accompanying drawings, wherein:

Fig. 1 is a perspective view of a combination float and harrow embodying the features of the present invention.

Fig. 2 is a detail sectional view through the harrow tooth mounting.

Fig. 3 is a detail sectional view through the journalled mounting of the harrow tooth shafts in the side frame members.

Fig. 4 is a longitudinal sectional view through the combination float and harrow.

Fig. 5 is a partial longitudinal sectional view through the harrow section, particularly illustrating the angular adjustment of same.

Fig. 6 is a horizontal sectional view through the spring stabilizer connecting the tongue and frame.

Fig. 7 is a vertical sectional view through the spring stabilizer.

Referring more in detail to the drawings:

1 designates a combination float and harrow in the nature of a device to be trailed for operation by a tractor or other motive device for working soil as in the preparation of a seed bed. The implement 1 includes a frame 2 of generally rectangular shape. The frame consists of spaced, parallel side bars 3 and 4, preferably being of channel cross-section having substantially vertical webs 5 and flanges 6 on said webs turned outwardly or laterally of the frame. A sweep or forward bar 7 is rigidly connected to the forward ends of the side bars, for example by angle gussets 8 which are welded or otherwise suitably secured to the sweep adjacent the ends thereof. The angle gussets 8 are preferably secured to the side bars by bolts 9 for facilitating disassembly and replacement of parts of the implement.

The sweep is preferably in the form of an angle cross-section and is bent or otherwise formed to provide portions 10 and 11 which converge forwardly from the ends of the side bars 3 and 4 respectively to a point 12 on the longitudinal center of the implement. It is preferable that the portions 10 and 11 be at an angle in the nature of 22° to a plane transversely of the path of travel of the implement. It is also preferable that the angle member forming the sweep 7 be arranged whereby the legs 13 and 14 slope rearwardly with the line of intersection of the legs adjacent a plane defined by the lower flanges of the side bars 3 and 4, the leg 13 of the sweep sloping upwardly and rearwardly and the leg 14 depending below the forward ends of the side bars 3 and 4 and sloping rearwardly whereby said leg 14 is at an angle in the nature of 55° with a vertical plane.

A crossbar or drag 15 is rigidly secured at the rear ends of the side bars 3 and 4, said drag being transversely to the direction of travel of the implement. The drag is preferably removably secured to the side bars by angle gussets 16 which are secured as by welding to the drag and bolted or otherwise suitably secured to the side bars 3 and 4, with end portions 17 of the drag extending laterally beyond the side bars to make a wider swath than is made by the sweep 7. The drag is preferably of angle cross-section with the legs 18 and 19 sloping rearwardly at an angle of approximately 45° with a vertical plane, the lower leg 19 depending below the lower flange of the side bars 3 and 4 as illustrated in Fig. 4. Suitable braces 20 and 21 have ends spaced forwardly of the drag 15 and removably secured as by bolts 22 to the side bars 3 and 4, said braces converging rearwardly and having their rear ends secured as by the bolt 23 to a bracket 24 fixed on the leg 18 of the drag 15. Additional bracing may be utilized if desired to provide a rigid frame structure.

The harrow section 25 consists of a plurality of shafts 26 which are preferably tubular and square in cross-section. The shafts 26 extend transversely of the implement and are spaced longitudinally thereof, the respective ends of said shafts extending through apertures 27 in the webs 5 of the side bars 3 and 4 whereby the ends of the shafts are rotatably mounted relative to said side bars. The apertures 27 and shafts 26 therein are spaced longitudinally relative to the side bars and are preferably arranged whereby the harrow section 25 is substantially midway the length of said side bars. A plurality of harrow teeth 28 are removably and adjustably mounted on the respective shafts 26 by individual clamps 29. Each of the clamps consists of a U-shaped member 30 having a bar 31 connecting spaced parallel legs 32 and 33 adapted to engage opposite faces of the shafts 26, said legs having aligned apertures 34 adjacent their free ends whereby the legs may be sleeved over and slidably engage the shanks of the harrow teeth 28.

The bar 31 is provided with a threaded aperture 35 into which is threaded a setscrew 36 whereby the end 37 of said setscrew is moved into engagement with the shaft 26 to force the bar 31 away from said shaft and draw the shank of the harrow teeth into tight engagement with the shaft. Nuts 38 and 39 are threaded on the setscrew on opposite sides of the bar 31 to securely lock the setscrew in adjusted position. By loosening the setscrew 36 the clamp is freed for sliding movement on the shaft transversely of the implement and the harrow tooth is released for sliding movement in the apertures 34 for adjusting the depth the points 40 of the harrow teeth will penetrate into the soil being worked, but when the setscrew is tightened, both the clamp and tooth are rigidly secured in adjusted position relative to the shaft 26.

Arms 41 are welded or otherwise suitably secured to each of the shafts 26 adjacent each end thereof whereby said arms substantially engage the inner faces of the webs 5 of the side bars 3 and 4 and prevent endwise movement of the shafts 26 relative to said side bars. The arms 41 are provided with apertures 42 adjacent their ends which align with apertures 43 in links 44 for receiving pins 45 forming pivotal connections between the links and arms. The arms on the rearmost shaft 26 extend upwardly above the side frame to form levers 46 whereby movement of the levers 46 reciprocates the links 44 to provide a corresponding movement of the arms 41 to rotate the shaft 26 and adjust the rearward slope of the harrow teeth 28. The levers 46 and harrow mechanism operated thereby are retained in adjusted position by rods 47 bent in the shape of a Z, whereby one end of said rods is pivoted in apertures 48 in the levers spaced from the connection with the links 44 and the other end of said rods inserted in spaced apertures 49 of vertical legs 50 of angle members 51 having the other legs 52 welded or otherwise suitably secured to the upper flange of the side bars 3 and 4. By moving the levers 46 for engagement of the end of the rods 47 in the selected apertures 49, the harrow teeth are adjusted and retained in selected positions.

A plurality of bars 53 extend longitudinally of the implement and are spaced transversely thereof in the harrow section. Each of said bars has a plurality of spaced apertures 54 which correspond to the spacing of the apertures 27 in the webs 5 of the side bars 3 and 4, whereby the shafts 26 extend through the apertures 54 and the bars form supports and bracing for the shafts. It is preferable that one of the bars 53 be arranged substantially on the longitudinal center of the implement and extend sufficiently forward of the foremost shaft 26 to mount a bolt, pin or the like 55 for journalling the rear end of a tongue member 56 and providing a connection between said tongue and the bar 53.

The tongue member 56 extends forwardly of the midpoint 12 of the sweep 7. The tongue of the implement also includes radius rods 57 and 58 having their rear ends journaled and connected by bolts 59 to the webs 5 of the side bars 3 and 4. The axes of the bolts 59 are aligned with the axis of the connection 55 whereby the tongue members are all rotatable about a common axis which is transversely of the implement. The radius rods 57 and 58 converge forwardly and engage the tongue member 56 slightly rearwardly of the sweep 7 and are provided with forwardly extending portions 60 which lie alongside of and are rigidly secured to the tongue member 56. The forward end of the tongue is provided with a clevis or the like 61 suitably connected to a draft member 62 providing a connection between the tongue and a tractor or other motive device (not shown). The forward portion of the tongue and radius rods are positioned between vertical guides 63 and 64 for vertical movement therebetween when said tongue is pivoted on the bolts 55 and 59.

The guides are illustrated as spaced angles having their lower ends suitably secured as by welding to the sweep adjacent the longitudinal center of the implement with the legs 65 turned inwardly whereby the sides of the forward portions of the tongue radius rods slidably engage the edges of the legs 65. A resilient member such as a coil spring 66 is mounted in the guides 63 and 64 and slidably engaged with the legs 65 to prevent lateral dislodgment of said spring. The lower end of said spring 66 rests on the forward portions of the tongue and the upper end engages a follower 67 slidably mounted in the guides and rotatably connected to a shank 68 on the end of a threaded shank 69 which is threadedly mounted in a threaded aperture 70 of a plate 71 secured to the upper ends of the guide angles 63 and 64. The upper end of the screw 69 is bent to form a crank 72 to facilitate turning the screw. Turning of the screw selectively moves the follower 67 up and down in the guides 63 and 64 to regulate the pressure of the spring 66 acting on the tongue of the implement.

In connecting the tongue to a tractor or the like the forward end of said tongue is lifted to make such connection and compresses the spring 66, and the guide members 63 and 64, being rigidly connected to the sweep 7, apply the weight of the forward end of the frame 2 on the upper end of the spring whereby the spring pressure tends to lift the forward end of the implement, thereby providing an adjustable control of the weight acting on the sweep as it moves over the soil being worked. Said spring also tends to stabilize or otherwise reduce the bouncing or rise and fall of the forward end of the frame 2 as it moves over terrain. Also the forces acting on the harrow teeth and on the drag 15 as the implement is moved over soil to be worked are transmitted through the frame and tongue to cooperate with the spring 66 in effecting the action of the float in its movement over the soil being worked.

In operating an implement constructed as described, the various setscrews 36 are loosened and the harrow teeth adjusted to desired positions and spacing transversely of the implement and for desired depths. The setscrews are then tightened to clamp the teeth to the shafts 26. Also clamps and teeth may be removed or additional ones added to provide the quantity of teeth desired in the harrow section. The hitch member 62 is then connected to a tractor or other motive device and the screw 69 rotated to adjust the spring tension to provide the desired spring support of the forward portion of the frame 2 on the tongue of the implement and hitch connection to the tractor. The Z rods are then removed from the apertures 49 of the angle members 51 and the levers 46 moved to operate the links 44 and rotate the shafts 26 to adjust the teeth 28 to the desired slope. The lower end of the Z rod is then inserted in the adjacent aperture 49 to retain the harrow teeth in adjusted position. The tractor or motive device is then operated to draw the combination float and harrow over soil to be worked, the sweep 7 at the forward end of the frame 2 moving over the soil tending to level ridges and break clods, the spring action facilitating the smoothing of the soil and stabilizing the vertical movement of the forward end of the frame 2. The harrow section follows and further works the soil with the drag 15 further smoothing the worked soil to form the seed bed. The portions of the drag extending laterally beyond the side members 3 and 4 tend to hold the implement in alignment whereby it will trail behind the motive device. The penetration and slope of the harrow teeth into the soil being worked exert a force on the frame 2 which cooperates with the forces acting on the sweep 7 and drag 15 to vary the effect of the spring 66 which, together with the tongue, stabilizes the movement of the implement whereby the float and harrow sections properly work the soil. If additional weight is desired at the rear portion of the implement, a box may be placed over the braces 20 and 21 and filled with suitable mass to obtain the desired weight acting on the soil being worked.

It is believed obvious that I have provided a combination float and harrow that has a stabilized movement for efficient operation in soil working prior to planting and the like.

What I claim and desire to secure by Letters Patent is:

An agricultural implement adapted to be towed by a tractor and the like over plowed soil for working same comprising, spaced side members arranged longitudinally of the direction of travel of the implement, front and rear members connecting the side members, said rear member extending transversely of the direction of travel of the implement and having portions extending laterally therefrom whereby forces from dragging the soil acting on the laterally extending portions aid in holding the implement in trailing alignment behind a towing tractor, said front member having portions converging forwardly from the side members to a point substantially on the longitudinal center of the implement, said front and rear members being of angle cross section with one leg of each sloping downwardly and rearwardly at an angle to the plane of the side members, said downwardly and rearwardly sloping legs extending below the side members whereby the lower edges of said legs aid in breaking, dragging and smoothing the soil, a harrow section including adjustable depending teeth supported by the side members intermediate the front and rear members, a tongue journalled on the side members forwardly of and adjacent the harrow section, means pivotally connecting the tongue to the harrow conection between the side members with the pivotal section axially aligned with the journaling of the tongue, spaced guide members fixed to the front member and extending upwardly therefrom, said tongue extending between the guide members above the front member and movable vertically therebetween, an abutment slidably mounted in the guide members above the tongue, means on the guide members for adjusting the position of the abutment, and a spring engaging the tongue and abutment between the guide members for supporting a portion of the weight of the implement on the tongue and stabilizing the rise and fall of the forward end of the implement over irregular terrain.

References Cited in the file of this patent

UNITED STATES PATENTS

| | | |
|---|---|---|
| 280,235 | Perry | June 26, 1883 |
| 1,341,539 | Brown | May 25, 1920 |
| 1,656,126 | Nixon | Jan. 10, 1928 |
| 2,038,438 | McMeekan | Apr. 21, 1936 |
| 2,210,223 | Taylor | Aug. 6, 1940 |
| 2,624,133 | Smeed | Jan. 6, 1953 |

FOREIGN PATENTS

| | | |
|---|---|---|
| 94,710 | Sweden | Feb. 15, 1939 |
| 268,357 | Italy | Oct. 12, 1929 |